United States Patent
Chen

(10) Patent No.: US 6,286,311 B1
(45) Date of Patent: Sep. 11, 2001

(54) SYSTEM AND METHOD FOR CONTROLLING A LOCOMOTIVE ENGINE DURING HIGH LOAD CONDITIONS AT LOW AMBIENT TEMPERATURE

(75) Inventor: Gong Chen, Erie, PA (US)

(73) Assignee: General Electric Company

( * ) Notice: Subject to any disclaimer, the term of this patent is extended or adjusted under 35 U.S.C. 154(b) by 0 days.

(21) Appl. No.: 09/572,132

(22) Filed: May 16, 2000

(51) Int. Cl.$^7$ ..................................................... F02B 29/04

(52) U.S. Cl. ........................ 60/599; 123/41.13; 123/563

(58) Field of Search .................. 60/598, 594; 123/41.13, 123/563

(56) References Cited

U.S. PATENT DOCUMENTS

| | | |
|---|---|---|
| 3,397,684 | 8/1968 | Scherenberg . |
| 3,621,907 | 11/1971 | Ephraim, Jr. et al. . |
| 3,648,715 | 3/1972 | Boothe . |

(List continued on next page.)

FOREIGN PATENT DOCUMENTS

| | | |
|---|---|---|
| 0 389 592 B1 | 10/1988 | (EP) . |
| 0 499 071 B1 | 1/1992 | (EP) . |
| 0 721 060 A2 | 7/1996 | (EP) . |
| 0 857 958 A1 | 8/1998 | (EP) . |
| 0 875 631 A1 | 11/1998 | (EP) . |
| 08186926 A | 7/1996 | (JP) . |
| 09195777 A | 7/1997 | (JP) . |

OTHER PUBLICATIONS

R. A. Nutt and R. F. Poehlman; Cooling System Requirements for Advanced Diesel Engines; SAE The Engineering Resource For Advancing Mobility West Coast International Meeting Aug. 16–19, 1992.

Jean–Pierre Moranne & Jerome J. Lukas; Air-to-Air Turbocharged Air Cooling Versus Air-to-Water Turbocharged Air Cooling; SAE The Engineering Resource For Advanced Mobility; International Congress & Exposition Feb. 27–Mar. 21, 1984.

Geoffrey Bond & Robert M. Brooks; Selection of the Optimized Afetecooling System for Cummins Premium Diesel Engines; SAE The Engineering Resource For Advanced Mobility; West Coast International Meeting & Exposition Aug. 6–9, 1984.

*Primary Examiner*—Hoang Nguyen
(74) *Attorney, Agent, or Firm*—Carl A. Rowold, Esq.; Enrique J. Mora, Esq.; Beusse, Brownlee, Bowdoin & Wolter PA

(57) ABSTRACT

A system and method for controlling a turbocharged compression-ignition engine having an intercooling system that uses a predetermined coolant fluid is provided. The engine is configured to receive a predetermined combustion-supporting fluid into a plurality of cylinders through a respective intake manifold. The method allows for detecting a full or high load engine condition using the amount of fuel injected into a cylinder per cylinder cycle and/or throttle notch position. The method also allows for sensing a predetermined parameter indicative of a respective ambient condition. The method further allows for selecting a desired value of a predetermined operational parameter that influences peak pressures developed within the cylinders. The desired value being selected based on the value of the parameter indicative of the ambient condition. A comparing step allows for comparing an actual value of the operational parameter against the desired value of that operational parameter. An actuating step allows for selectively actuating the intercooling system based on the results of the comparison step to adjust the actual value of the operational parameter to reduce engine $NO_x$ emission and contain cylinder peak pressure within acceptable limits during high load operations regardless of the ambient condition with minimal deterioration in engine output performance and capability.

49 Claims, 2 Drawing Sheets

U.S. PATENT DOCUMENTS

| | | |
|---|---|---|
| 3,771,293 | 11/1973 | Vest . |
| 3,863,612 | 2/1975 | Wiener . |
| 4,061,187 | 12/1977 | Rajasekaran et al. . |
| 4,133,185 | 1/1979 | Dickey . |
| 4,231,384 | 11/1980 | Christensen . |
| 4,413,595 | 11/1983 | Potts, Jr. . |
| 4,592,323 | 6/1986 | Vest . |
| 4,656,973 | 4/1987 | Endres . |
| 4,711,204 | 12/1987 | Rusconi . |
| 4,894,780 | 1/1990 | Simonyi et al. . |
| 4,907,645 | 3/1990 | Dumas et al. . |
| 4,918,923 * | 4/1990 | Woollenweber et al. .......... 60/599 X |
| 4,955,431 | 9/1990 | Saur et al. . |
| 4,961,404 | 10/1990 | Itakura et al. . |
| 5,036,803 | 8/1991 | Nolting et al. . |
| 5,201,285 | 4/1993 | McTaggart . |
| 5,353,757 | 10/1994 | Susa et al. . |
| 5,392,741 | 2/1995 | Uzkan . |
| 5,415,147 | 5/1995 | Nagle et al. . |
| 5,566,745 | 10/1996 | Hill et al. . |
| 5,598,705 | 2/1997 | Uzkan . |
| 5,669,311 | 9/1997 | Hill et al. . |
| 5,828,967 | 10/1998 | Ueda . |
| 5,910,099 * | 6/1999 | Jordan, Jr. et al. .................... 60/599 |
| 6,006,731 | 12/1999 | Uzkan . |

* cited by examiner

US 6,286,311 B1

SYSTEM AND METHOD FOR CONTROLLING A LOCOMOTIVE ENGINE DURING HIGH LOAD CONDITIONS AT LOW AMBIENT TEMPERATURE

BACKGROUND OF THE INVENTION

The present invention is generally related to control systems and techniques for controlling compression-ignition engines, and, more particularly, this invention is related to a control system and method for reducing exhaust emissions and containing cylinder peak pressure particularly when the engine operates during high load conditions at a low ambient temperature.

Relatively large compression-ignition engines, such as those used for locomotives or power generation systems, are usually operated at full load with cylinder peak pressure ($p_p$) close to but not exceeding a maximum structurally allowable value ($p_{max}$). As ambient conditions change, such as when ambient temperature ($T_a$) drops below a standard design point, e.g., a nominal operating temperature, and with ambient pressure ($p_a$) remaining unchanged at a nominal value, $p_p$ increases and could exceed $p_{max}$, resulting in undesirable increases in engine component stress and loading. Unfortunately, known techniques for avoiding a high $p_p$, such as retarding fuel injection timing and reducing power output, are believed to undesirably deteriorate engine fuel efficiency and reduce engine power capability.

In view of the foregoing considerations, it is desirable to provide a system and method for controlling turbocharged compression-ignition engines to reduce exhaust emissions and contain cylinder peak pressure within structurally allowable limits, particularly during high load conditions at a low ambient temperature with minimal deterioration in engine efficiency and power capability.

SUMMARY OF THE INVENTION

Generally speaking, the present invention fulfills the foregoing needs by providing a method for controlling a turbocharged compression-ignition engine having an intercooling system that uses a predetermined coolant fluid. For example, the engine may be used for powering locomotives and power generation systems. The engine is configured to receive a predetermined combustion-supporting fluid into a plurality of cylinders through a respective intake manifold. The method allows for detecting or determining a full load or a high load engine condition by monitoring the amount of fuel injected into a cylinder per cylinder cycle and/or throttle notch position. The method also allows for sensing a predetermined parameter indicative of a respective ambient condition. The method further allows for selecting a desired value of a respective operational parameter that influences peak pressures developed within the cylinders. The desired value being selected based on the value of the parameter indicative of the ambient condition. A comparing step allows for comparing an actual value of the operational parameter against the desired value of that operational parameter. An actuating step allows for selectively actuating the intercooling system based on the results of the comparison step to adjust the actual value of the operational parameter to reduce engine $NO_x$ emission and contain the peak pressure within acceptable limits during high load conditions at a low ambient temperature with minimal deterioration in engine efficiency and power capability.

The present invention may further fulfill the foregoing needs by providing a control system for controlling a turbocharged compression-ignition engine having an intercooling system that uses a predetermined coolant fluid. The engine is configured to receive a predetermined combustion-supporting fluid into a plurality of cylinders through a respective intake manifold. The control system comprises a detector coupled to detect a full load or a high load engine condition by monitoring the amount of fuel injected into a cylinder per cylinder cycle and/or throttle notch position. The control system also comprises a sensor coupled to sense a predetermined parameter indicative of a respective ambient condition. A selecting module is coupled to the sensor to select a desired value of a predetermined operational parameter that influences peak pressures developed within the cylinders. The desired value being selected based on the value of the parameter indicative of the respective ambient condition. A comparator module is coupled to compare an actual value of the operational parameter against the desired value of that operational parameter to generate a comparator output signal. A control module is coupled to receive the comparator output signal to selectively actuate the intercooling system to adjust the actual value of the operational parameter to reduce engine $NO_x$ emission and contain the peak cylinder pressure within acceptable limits during high load conditions at a low ambient temperature with minimal deterioration in engine efficiency and engine power capability.

Figure 1:
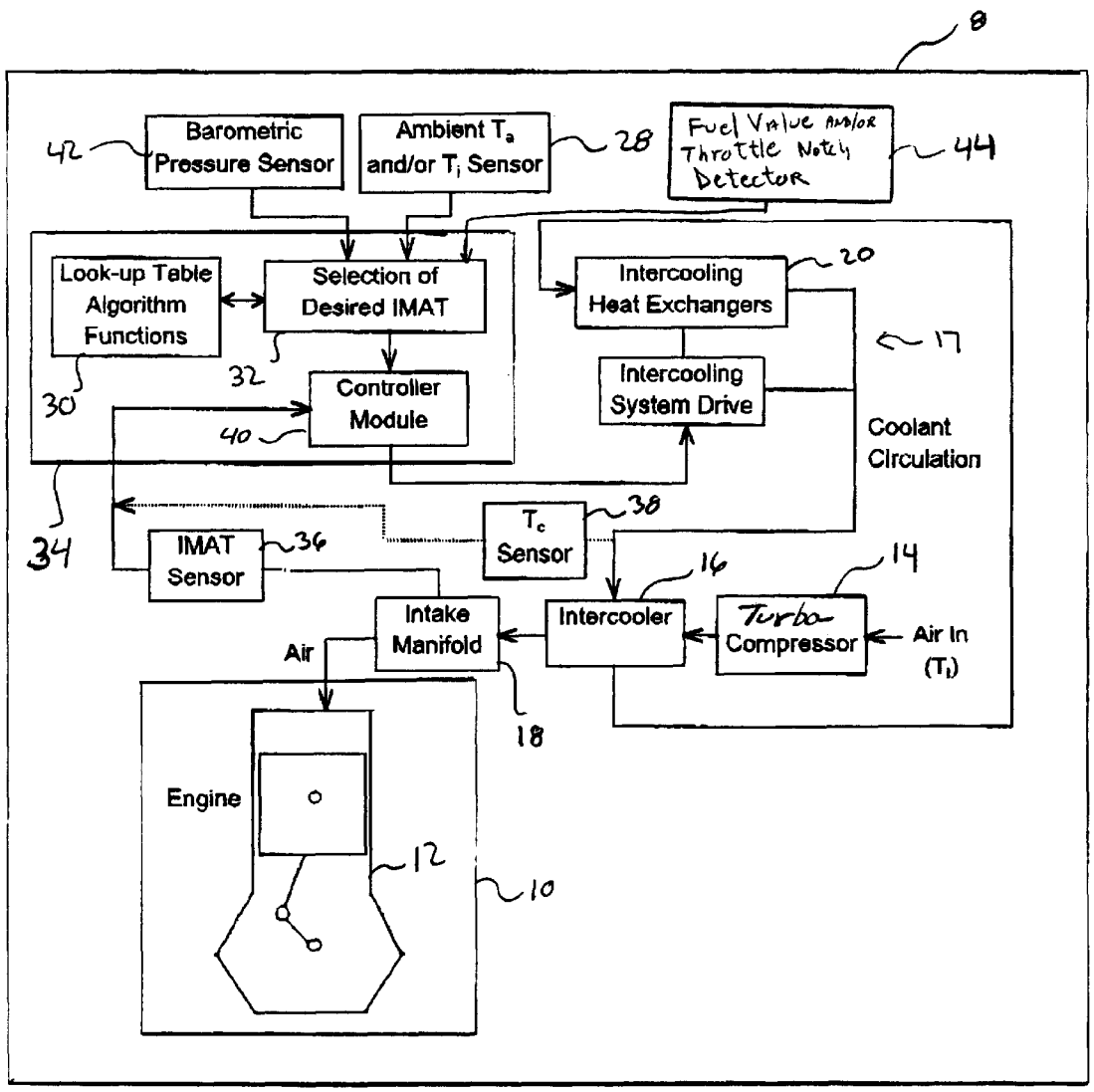
FIG. 1 is a schematic block diagram of an exemplary control system embodying the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

As illustrated in FIG. 1, an exemplary equipment 8, such as a locomotive or power generation system, may include a compression-ignition engine 10, such as a medium-speed ( e.g., from about 300 RPM to about 1200 RPM) turbocharged and intercooled diesel engine, that may be used for driving suitable power generation equipment. Engine 10 may be constructed in fashion well-known to those skilled in the art to operate at a selected load and/or speed, such selection may be executed by setting the throttle of the engine in a respective notch position in the locomotive. It is desirable that at a full load or a high load condition the engine be operated with cylinder peak pressure ($p_p$) close to but not exceeding a maximum structurally allowable pressure value ($p_{max}$). As used herein, full and/or high engine load refer to conditions during which the respective cylinder peak pressures would buildup to exceed or unacceptably approach the $p_{max}$ value, in the event such conditions were not controlled to avoid or prevent any such buildup. In general locomotive configurations, ambient temperature ($T_a$) may be indicative of an engine inlet air temperature ($T_i$). Thus, in some applications one could sense temperature $T_a$ to obtain a measurement indicative of temperature $T_i$. It will be appreciated, however, that in other applications ambient temperature may not be indicative of inlet air temperature, such as may occur where the air delivered to a turbocharger compressor 14, is preconditioned due to the configuration of the locomotive. Thus, in some applications, inlet air temperature $T_i$ will be one influencing variable in the control strategy in connection with cylinder peak pressure and ambient temperature $T_a$ will be another influencing variable in the control strategy for assessing cooling system capacity, with the understanding that in some applications ambient temperature and inlet air temperature may be interchangeable.

Assuming an application where ambient temperature $T_a$ and inlet air temperature $T_i$ are interchangeable, then as $T_a$ changes with inlet air pressure remaining constant, the density of the inlet air varies, and the air density increases as $T_a$ decreases and, conversely, is lowered as $T_a$ increases, affecting the amount of air delivered into an engine cylinder 12. It will be readily understood that engine 10 may comprise a plurality of cylinders 12. Thus, as will be appreciated by those skilled in the art, one of the consequent effects is that the engine cylinder peak pressure is affected by $T_i$ which may be approximated by $T_a$ in some applications. As $T_a$ is lowered from the nominal operating temperature, cylinder peak pressure $p_p$ increases and can exceed the structurally allowable maximum $p_{max}$, resulting in increased engine components stresses and loading. It will be appreciated that the engine cylinder peak pressure is also affected by barometric pressure $p_a$ since as $p_a$ is reduced from a nominal pressure while ambient temperature remains fixed, cylinder peak pressure would be reduced.

In engine 10, the inlet air is compressed, as is known in the art, using compressor 14 and then cooled by an intercooler 16, which is part of an intercooling system 17, and passes through a respective intake manifold 18 prior to being drawn into cylinder 12. A fluid coolant used by the intercooling system is circulated to one or more intercooling radiators or heat exchangers 20 so that heat absorbed from the compressed air is carried by the coolant to the radiator and transferred to the environment. The engine cylinder peak pressure $p_p$ is related to the temperature (IMAT) of intake manifold air which is typically the air delivered by intercooler 16 prior to entering cylinder 12. As will be appreciated by those skilled in the art, one can analytically and/or experimentally determine a respective functional relation or model between intake manifold air temperature (IMAT) and other operational parameters of the intercooler system. Examples of such operational parameters may include thermal properties of the intercooler coolant, such as its temperature and/or flow rate. Thus, it will be appreciated that, in addition to or in lieu of sensing and controlling IMAT, one could sense and control such other operational parameters of the intercooler system to influence the level of engine cylinder peak pressure $p_p$.

The present invention advantageously recognizes that in a typical turbocharged and intercooled diesel engine, engine peak pressure $p_p$ is related to intake manifold air temperature IMAT. Namely, a decrease in IMAT would lower intake manifold air pressure and would result in a lower $p_p$. It will be appreciated that an achievable IMAT would depend upon the intercooling system capacity which in turn would be largely affected by $T_a$ and/or $p_a$. A lower $T_a$ and a higher $p_a$ would lead to a lower achievable IMAT, presuming that an intercooling system drive 22 to drive the various intercooler system components, such as coolant circulation pumps, radiator fans, (not shown) remains unchanged. Thus, the engine cylinder peak pressure $p_p$ at a low ambient temperature $T_a$ during high load operations may now be reduced by adjusting intake manifold air temperature IMAT without changes in the intercooling system hardware.

Therefore, it is desirable to reduce exhaust emissions and contain cylinder peak pressure of turbocharged diesel engines while operating at relatively low ambient temperatures and relatively high barometric pressure during high load operations by adjusting engine intake manifold air temperature. In one aspect of the present invention, a method for controlling a compression-ignition engine allows for implementing the following exemplary steps or actions: A step for detecting or determining a full load or high load engine condition. A step for sensing ambient temperature $T_a$ and/or inlet air temperature $T_i$. A step for sensing barometric pressure $p_a$. A step for selecting a desired IMAT and/or a desired intercooler coolant temperature ($T_c$) as a function of ambient temperature $T_a$ and/or inlet temperature $T_i$ and barometric pressure $p_a$. A step for sensing the actual IMAT (and/or the actual $T_c$). A step for selectively actuating the intercooling system based on the value of the actual IMAT compared to the desired IMAT (and/or the actual $T_c$ compared to the desired $T_c$). For example, actuating and/or speeding up the intercooling system operation as the actual IMAT is higher than the desired IMAT, and/or the actual $T_c$ is higher than the desired $T_c$. The actuating step may further include turning off or slowing down the intercooling system operation when the actual IMAT is lower than the desired IMAT and/or the actual $T_c$ is lower than the desired $T_c$. A step of updating the desired values of IMAT and/or desired $T_c$ as a function of changes in ambient temperature and/or inlet temperature $T_i$ and barometric pressure $p_a$. For example, the updating step could include selecting a lower value of the desired IMAT and/or desired $T_c$ when $T_a$ becomes lower in the range of concern of peak pressure $p_p$, or selecting a higher value of the desired IMAT (or desired $T_c$) when $T_a$ becomes higher. A step for returning to a standard or default value of the desired IMAT when the ambient temperature $T_a$ and/or inlet temperature $T_i$ is at or above a respective nominal operating point for a sensed barometric pressure, or returning to the standard or default value of IMAT when barometric pressure $p_a$ is at or below a respective nominal operating point for a sensed ambient temperature and/or inlet air temperature.

The method of the present invention as described above may be implemented with an exemplary controller system 34, as shown in FIG. 1. During such implementation, ambient temperature $T_a$ and/or inlet temperature $T_i$ may be respectively monitored and sensed by respective temperature sensing means 28 installed at predetermined locations in the equipment, such as the engine ambience, the engine compartment, or in the air path that delivers air to compressor 14. Further, barometric pressure may be respectively monitored by a barometric pressure sensor 42. In one exemplary embodiment, a full load or high load engine condition that could result in unacceptable buildup of peak cylinder pressure may be detected by a fuel value and/or throttle notch detector 44. The fuel value is the amount of fuel, such as volume or mass of fuel, injected into a cylinder per cylinder cycle. A full load or high load is determined as the fuel value is higher than a predefined value, or when the throttle notch setting is higher than a predefined notch setting, or both. The desired values of manifold air temperature IMAT and/or desired intercooler coolant temperature $T_c$ as a function of $T_a$ and/or $T_i$ and further as a function of barometric pressure $p_a$ for the emission reduction and cylinder peak pressure modulation may be stored in a memory unit, such as one or more look-up tables in unit 30, coupled to a module 32 for selecting desired IMAT and/or coolant temperature, each part of controller system 34. The memory unit 30 and/or module 32 may also include pre-programmed logic functions and computer-readable code, e.g., computer-readable algorithms, to determine a desired IMAT and/or $T_c$ for particular ambient and/or inlet air conditions. As suggested above, it would be preferable to set up the desired IMAT and/or desired intercooler coolant temperature $T_c$ to a default IMAT value and/or nominal coolant temperature $T_c$ value for $T_a$ and/or $T_i$ at or above the nominal operating point and for ambient pressure $p_a$ at or below the nominal point in view of the practical constraints of intercooling system cooling capacity. It will be appreciated that the desired default IMAT value may vary depending on the actual conditions, such as barometric pressure, ambient temperature and/or inlet air temperature, and load conditions.

When the engine is operating at a particular ambient temperature $T_a$ and/or $T_i$ and $p_a$, the controller receives the sensed value of $T_a$ and/or $T_i$ and $p_a$ and a corresponding desired value of IMAT (and/or desired $T_c$) is selected by module 32 in response to the ambient temperature and/or inlet temperature, and barometric pressure. An actual IMAT (and/or actual $T_c$) is sensed by respective sensing means 36 and 38 and then compared in a controller module 40 with the desired IMAT (and/or desired $T_c$). The actuation and speed of the intercooling system operation is selectively controlled by the outcome of the comparison. It will be appreciated that various control techniques, as will readily understood by one skilled in the art, may be used for controlling operation of the intercooling system based upon the results of the comparison. By way of example and not of limitation, step, differential, proportional plus integral, and other control techniques may be used for controlling operation of the intercooler system based on the comparison results.

As the engine is operating at a normal or higher ambient temperature and/or lower barometric pressure relative to the respective nominal operating points, the level of cylinder peak pressure is generally not a concern and assuming the intercooling system capacity for removing heat is limited, then the desired IMAT may be set at its standard design point. Conversely, when the engine is operating at a relatively low $T_a$, and relatively high $p_a$, then the desired IMAT (and/or desired $T_c$) is respectively set to lower values based on the values in the one or more look-up tables and/or the values determined using the functions and algorithm stored in memory unit 30 and/or module 32. It will be now appreciated that achieving the desired IMAT (and/or desired $T_c$) as may be executed by control system 34, would advantageously result in a lower $p_p$ relative to the peak pressure that otherwise would be achieved without reducing IMAT. Thus, the engine cylinder peak pressure may now be conveniently contained while operating at relatively low ambient temperatures during high load conditions to maintain structurally allowable operation with reduced deterioration in power output capability. In addition, engine exhaust $NO_x$ emission is reduced due to the lowered IMAT.

Figure 2:
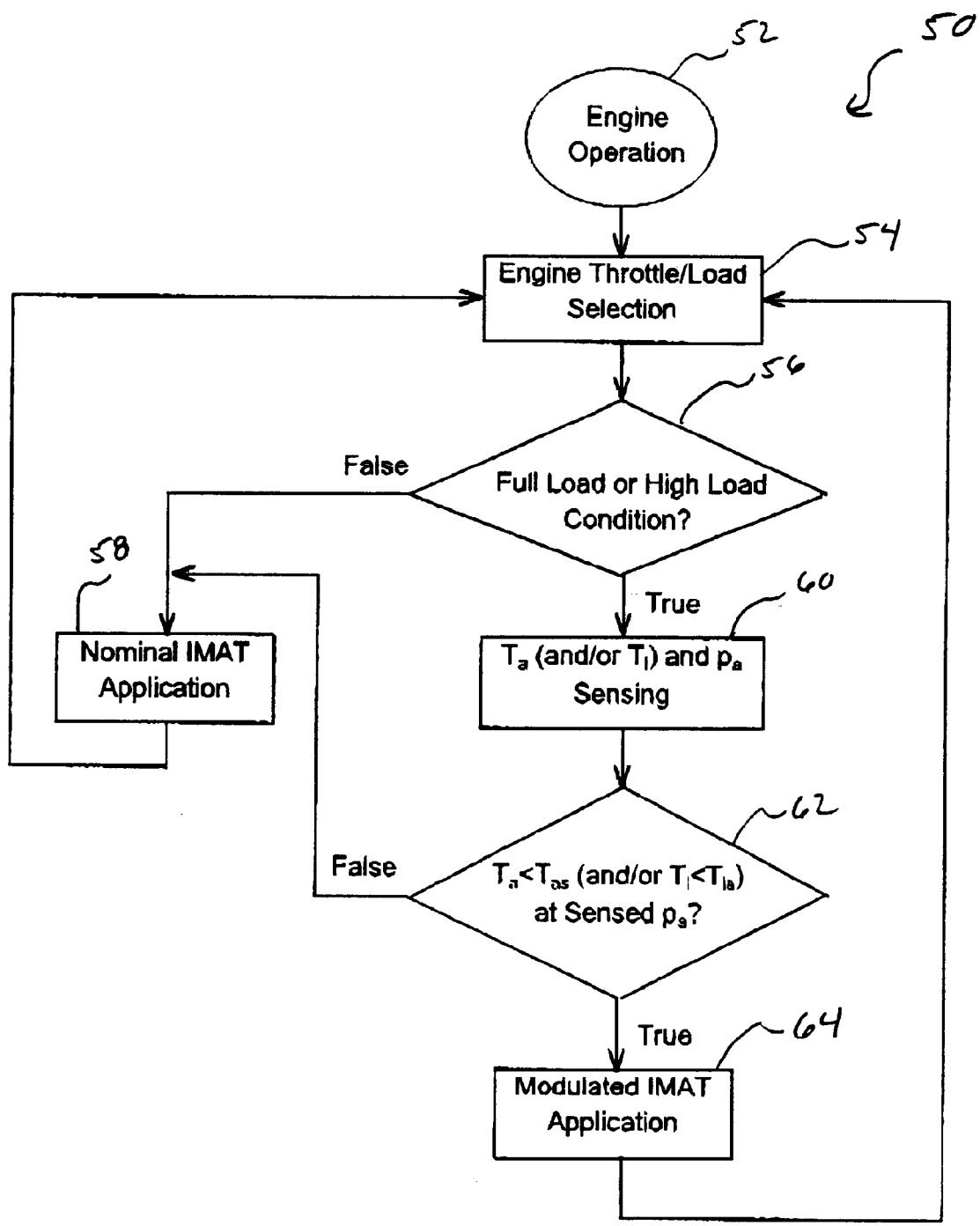
FIG. 2 is a flow chart illustrating operational details of the present invention.

FIG. 2 shows a flow chart 50 for illustrating exemplary operational details of the present invention. Subsequent to start step 52, step 54 allows for selecting the level of speed and load being applied to the engine in operation. Step 56 allows for detecting and determining the presence of a full or high load engine condition. Step 56 may be implemented by monitoring the amount of fuel, such as volume or mass of fuel injected into a cylinder per cylinder cycle using a fuel value determination means and/or the engine throttle notch using a suitable notch position sensor. As shown in steps 56 and 58, if the engine is not in a full load condition or in a relatively high load condition, then the techniques of the present invention for modulating or controlling IMAT are skipped and a desired default IMAT value is applied at step 58. Conversely, if the engine is in a full load condition or in a relatively high load condition, then as shown at steps 60, 62 and 64, the techniques discussed in the context of FIG. 1 for controlling IMAT may be executed. As suggested above, step 60 allows for respectively sensing ambient temperature $T_a$ (and/or inlet air temperature $T_i$) and barometric pressure $p_a$. If temperature $T_a$ (and/or inlet air temperature $T_i$) is equal or less than a respective nominal or trigger temperature $T_{as}$ (and/or nominal or trigger inlet air temperature $T_{is}$) for a sensed barometric pressure $p_a$, then step 64 allows for executing IMAT control using the IMAT modulation techniques discussed above for reducing exhaust emissions and containing cylinder peak pressure. If temperature $T_a$ (and/or inlet air temperature $T_i$) is above the respective nominal temperature $T_{as}$ (and/or nominal inlet air temperature $T_{is}$) for the sensed barometric pressure $p_a$, then step 58 allows for reverting to the default IMAT value that, as suggested above, may vary depending on the actual environmental and/or operational conditions to which the engine is exposed. It will be appreciated by those skilled in the art, that the value of the nominal ambient temperature (and/or nominal air inlet temperature) for determining IMAT control may vary as a function of barometric pressure $p_a$. For example, the respective value of the nominal ambient temperature (and/or inlet air temperature) used at sea level for triggering the control techniques to contain cylinder peak pressure may be different from the value used at an altitude of 5000 ft. It will be further appreciated that the nominal variable for triggering IMAT control to reduce exhaust emissions and contain cylinder peak pressure could have been chosen in terms of a nominal or trigger barometric pressure $p_{as}$ that varies as a function of the sensed ambient temperature and/or inlet air temperature.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling a turbocharged compression-ignition engine during a full or high load condition, the engine having an intercooling system that uses a predetermined coolant fluid, the engine being configured to receive a predetermined combustion-supporting fluid into a plurality of cylinders through a respective intake manifold, the method comprising:

detecting the presence of the full and/or high load condition of the engine;

sensing a parameter indicative of a respective ambient condition;

selecting a desired value of a respective operational parameter that influences peak pressures developed within the cylinders, the desired value being selected based on the value of the parameter indicative of the respective ambient condition;

comparing an actual value of the operational parameter against the desired value of that operational parameter; and selectively actuating the intercooling system based on the results of the comparison step to adjust the actual value of the operational parameter to contain the peak cylinder pressures.

2. The method of claim 1 wherein the combustion-supporting fluid is air.

3. The method of claim 1 wherein the predetermined operational parameter is intake manifold air temperature and the detecting step comprises detecting an engine fuel value delivered to a respective cylinder per cylinder cycle and/or throttle setting of the engine.

4. The method of claim 1 wherein the predetermined operational parameter is coolant fluid temperature.

5. The method of claim 1 wherein the predetermined operational parameter is intake manifold air temperature and/or coolant temperature.

6. The method of claim 1 wherein the sensed parameter indicative of the respective ambient condition is ambient temperature.

7. The method of claim 1 wherein the sensed parameter indicative of the respective ambient condition is inlet air temperature.

8. The method of claim 1 wherein the sensed parameter indicative of the respective ambient condition is barometric pressure.

9. The method of claim 1 further comprising a step of updating the desired value of the predetermined operational parameter as a function of the present value of the parameter indicative of ambient conditions.

10. The method of claim 9 wherein the updating step comprises selecting a lower desired value of the predetermined operational parameter as ambient and/or inlet air temperature decreases below a nominal temperature value corresponding to a sensed barometric pressure.

11. The method of claim 10 wherein the updating step comprises selecting a higher desired value of the predetermined operational parameter as ambient temperature and/or inlet air temperature increases up to the nominal temperature value for the sensed barometric pressure.

12. The method of claim 9 wherein the updating step comprises selecting a lower desired value of the predetermined operational parameter as barometric pressure increases above a respective nominal barometric pressure value corresponding to a sensed ambient temperature and/or inlet air temperature.

13. The method of claim 12 wherein the updating step comprises selecting a higher desired value of the predetermined operational parameter as barometric pressure decreases up to the nominal barometric pressure value for the sensed ambient temperature and/or inlet air temperature.

14. The method of claim 9 wherein the updating step comprises setting the desired value of the predetermined operational parameter to be equal to a default value corresponding to a sensed barometric pressure when ambient temperature and/or inlet air temperature is equal to or above a nominal temperature value.

15. The method of claim 1 wherein the engine is in a locomotive and the engine comprises a diesel engine.

16. A control system for controlling a turbocharged compression-ignition engine having an intercooling system that uses a predetermined coolant fluid, the engine being configured to receive a predetermined combustion-supporting fluid into a plurality of cylinders through a respective intake manifold, the control system comprising:
   means for sensing a predetermined parameter indicative of a respective ambient condition;
   means for selecting a desired value of a predetermined operational parameter that influences peak pressures developed within the cylinders, the desired value being selected based on the value of the parameter indicative of the respective ambient condition;
   means for comparing an actual value of the operational parameter against the desired value of that operational parameter; and
   means for selectively actuating the intercooling system based on the comparison results to adjust the actual value of the operational parameter to contain the peak cylinder pressures.

17. The system of claim 16 wherein the combustion-supporting fluid is air.

18. The system of claim 16 wherein the predetermined operational parameter is intake manifold air temperature.

19. The system of claim 16 wherein the predetermined operational parameter is coolant fluid temperature.

20. The system of claim 16 wherein the predetermined operational parameter is intake manifold air temperature and/or coolant temperature.

21. The system of claim 16 wherein the sensed parameter indicative of the respective ambient condition is ambient temperature.

22. The system of claim 16 wherein the sensed parameter indicative of the respective ambient condition is air inlet temperature.

23. The system of claim 16 wherein the sensed parameter indicative of the respective ambient condition is barometric pressure.

24. The system of claim 16 further comprising means for storing the desired values of the predetermined operational parameter as a function of the respective ambient condition.

25. The system of claim 16 further comprising means for updating the desired value of the predetermined operational parameter as a function of the present value of the parameter indicative of the ambient condition.

26. The system of claim 25 wherein the updating means comprises means for selecting a lower desired value of the predetermined operational parameter as ambient and/or inlet air temperature decreases below a nominal temperature value corresponding to a sensed barometric pressure.

27. The system of claim 26 wherein the updating means further comprises means for selecting a higher desired value of the predetermined operational parameter as ambient temperature and/or inlet air temperature increases up to the nominal temperature value for the sensed barometric pressure.

28. The system of claim 25 wherein the updating means further comprises means for selecting a lower desired value of the predetermined operational parameter as barometric pressure increases above a respective nominal barometric pressure value corresponding to a sensed ambient temperature and/or inlet air temperature.

29. The system of claim 28 wherein the updating means further comprises means for selecting a higher desired value of the predetermined operational parameter as barometric pressure decreases up to the nominal barometric pressure value for the sensed ambient temperature and/or inlet air temperature.

30. The system of claim 25 wherein the updating means further comprises means for setting the desired value of the predetermined operational parameter to be equal to a default value corresponding to a sensed barometric pressure when ambient temperature and/or inlet air temperature is equal or above a nominal temperature value.

31. The system of claim 16 wherein the engine is in a locomotive and the engine comprises a diesel engine.

32. A control system for controlling a turbocharged compression-ignition engine having an intercooling system that uses a predetermined coolant fluid, the engine being configured to receive a predetermined combustion-supporting fluid into a plurality of cylinders through a respective intake manifold, the control system comprising:

a detector coupled to detect the presence of the full or high load condition of the engine;

a sensor coupled to generate a predetermined parameter indicative of a respective ambient condition;

a module coupled to the sensor and configured to select a desired value of a predetermined operational parameter that influences peak pressures developed within the cylinders, the desired value being selected based on the value of the parameter indicative of the respective ambient condition;

a comparator module coupled to compare an actual value of the operational parameter against the desired value of that operational parameter to generate a comparator output signal; and a control module coupled to the receive the comparator output signal to selectively actuate the intercooling system to adjust the actual value of the operational parameter to contain the peak cylinder pressures.

33. The system of claim 32 wherein the combustion-supporting fluid is air.

34. The system of claim 32 wherein the predetermined operational parameter is intake manifold air temperature.

35. The system of claim 32 wherein the predetermined operational parameter is coolant fluid temperature.

36. The system of claim 32 wherein the predetermined operational parameter is intake manifold air temperature and/or coolant temperature.

37. The system of claim 32 wherein the sensed parameter indicative of the respective ambient condition is ambient temperature.

38. The system of claim 32 wherein the sensed parameter indicative of the respective ambient condition is air inlet temperature.

39. The system of claim 32 wherein the sensed parameter indicative of the respective ambient condition is barometric pressure.

40. The system of claim 32 further comprising a memory unit configured to store the desired values of the predetermined operational parameter as a function of the respective ambient condition.

41. The system of claim 32 wherein the module coupled to the sensor includes a submodule configured to update the desired value of the predetermined operational parameter as a function of the present value of the parameter indicative of the respective ambient condition.

42. The system of claim 41 wherein the submodule is further configured to select a lower desired value of the predetermined operational parameter as ambient and/or inlet air temperature decreases below a nominal temperature value corresponding to a sensed barometric pressure.

43. The system of claim 42 wherein the submodule is further configured to select a higher desired value of the predetermined operational parameter as ambient temperature and/or inlet air temperature increases up to the nominal temperature value for the sensed barometric pressure.

44. The system of claim 41 wherein the submodule is further configured to select a lower desired value of the predetermined operational parameter as barometric pressure increases above a respective nominal barometric pressure value corresponding to a sensed ambient temperature and/or inlet air temperature.

45. The system of claim 44 wherein the submodule is further configured to select a higher desired value of the predetermined operational parameter as barometric pressure decreases up to the nominal barometric pressure value for the sensed ambient temperature and/or inlet air temperature.

46. The system of claim 41 wherein the submodule is further configured to set the desired value of the predetermined operational parameter to be equal to a default value corresponding to a sensed barometric pressure when ambient temperature is equal or above a nominal temperature value.

47. The system of claim 32 wherein the engine is in a locomotive and the engine comprises a diesel engine.

48. The system of claim 32 wherein the detector comprises means for detecting a respective throttle notch setting of the engine.

49. The system of claim 32 wherein the detector comprises means for detecting an engine fuel value received by a respective cylinder per cylinder cycle.

* * * * *